US005555617A

United States Patent [19]

Pope

[11] Patent Number: 5,555,617

[45] Date of Patent: Sep. 17, 1996

[54] PALLET MANUFACTURING APPARATUS

[76] Inventor: Harold W. Pope, Rte. 5, Box 94, Piedmont, Ala. 36272

[21] Appl. No.: 320,043

[22] Filed: Oct. 7, 1994

[51] Int. Cl.$^6$ .......... B23P 19/04

[52] U.S. Cl. .......... 29/772; 29/798; 269/910

[58] Field of Search .......... 29/432, 7–9, 772, 29/798; 227/6, 7, 45, 50; 269/910

[56] References Cited

U.S. PATENT DOCUMENTS

| | | | |
|---|---|---|---|
| 4,403,388 | 9/1983 | Belcher | 227/7 X |
| 4,793,540 | 12/1988 | Mangan et al. | 227/7 |
| 4,824,004 | 12/1989 | Hanson | 29/798 X |
| 4,998,336 | 12/1991 | Papsdorf | 269/910 X |
| 5,095,605 | 3/1992 | Tonus | 29/432 |
| 5,249,352 | 10/1993 | Landers | 29/798 X |
| 5,375,315 | 12/1994 | Griffith et al. | 29/772 X |

FOREIGN PATENT DOCUMENTS

| | | | |
|---|---|---|---|
| 321129 | 12/1989 | Japan | 29/798 |

OTHER PUBLICATIONS

*Pallet Enterprise;* Jun. 1994; p. 71; Advertisement for "Pallet Chief" by Diversified Industries of Sylacauga, Alabama.

Advertisement for "Bronce Semi–Automatic Pallet Nailing System with Stacker" by Bronco Pallet Systems, P.O. Box 148, Bay City, Texas 77414.

Advertisement for "Rayco Industries Edge Automatic Pallet Machine" by Rayco Industries, Inc., 1502 Valley Road, Richmond, Virginia 23222–5407.

*Primary Examiner*—Peter Vo
*Attorney, Agent, or Firm*—Dority & Manning, P.A.

[57] ABSTRACT

A pivotal hold down arm for holding boards as they are being nailed by nailing guns to form a pallet. The nailing guns are carried on a movable gantry. Rollers are carried by the gantry for limiting the downward movement of the nailing guns.

12 Claims, 8 Drawing Sheets

PALLET MANUFACTURING APPARATUS

BACKGROUND OF THE INVENTION

Pallets are used frequently in shipping goods and are normally constructed of an upper tier of deck boards that are spaced from a lower tier of boards by intermediate stringer boards. In one particular pallet construction, there are three intermediate stringer boards so that there are elongated slots provided in the pallet. When lifting the pallet using a fork lift, the tongs of the fork lift are inserted into these elongated slots with the load carried on the upper tier of boards.

In order to construct the pallets in the past, nailing guns have been used for nailing spaced upper and lower deck boards to the three intermediate stringer boards.

The boards prior to being nailed were normally laid up on a table so that a gantry supporting a plurality of nailing guns could be moved across the pallet for nailing the upper and lower tier of boards to the stringers. Normally the nailing gun was operated by means of tabs positioned along the table which activated the nailing gun at predetermined locations for nailing the pallets. One problem heretofore encountered was that normally the upper tier of boards was merely resting on the stringers, and as a result they could possibly be moved out of position and not be properly located during the nailing operation.

OBJECTS AND SUMMARY OF THE INVENTION

It is a principal object of the present invention to provide a method and apparatus for efficiently and in a simple manner nailing deck boards to stringers to form pallets.

Another important object of the present invention is to provide an apparatus for holding a plurality of deck boards flush against stringers when nailing up a pallet.

Still another important object of the present invention is to provide an efficient and simple apparatus for nailing the deck boards to stringers at precise locations during the construction of a pallet.

Additional objects and advantages of the invention will be set forth in part in the description which follows, and in part will be obvious from the description, or may be learned by practice of the invention.

The solution of this problem consists in utilizing a pair of pivotal arms which can be lowered on top of the deck boards prior to nailing up of the pallet for applying pressure to the deck boards during the nailing operation. The pivotal arms which are used for holding the deck boards are held in a parallel position relative to the surface of the deck board regardless of the thickness of the pallet. After the nailing operation has been completed, the pivotal arms are raised for allowing the pallet to be shifted on a conveyor chain to a receiving station and for allowing another set of stringers and deck boards to be set up so that they can be automatically nailed together.

The deck boards are nailed to the stringers by automatic nailing machines that are carried on a movable gantry. A sensor is provided adjacent to the nailing head for sensing the presence of a deck board. The sensor in turn sends a signal to a convention programmable controller which starts a counter counting. During this period of time, a motor is activated for shifting the gantry. The counter is set to activate the nail driving machines after a predetermined count which corresponds to a predetermined distance. The programmable controller can be set to either nail one nail in the deck boards or a plurality of nails depending on the design construction of the pallet.

At the end of the travel of the gantry and when all of the deck boards have been nailed, a limit switch is activated to reverse the direction of a drive motor and drive a chain for retracting the gantry to its initial position. Once it reaches its initial starting position, movement is stopped as a result of striking another limit switch. The hold down arms are then raised up off of the nailed pallet for allowing the pallet to be transported by a conveyor chain to a receiving station.

DESCRIPTION OF THE PREFERRED EMBODIMENTS

Figure 1:
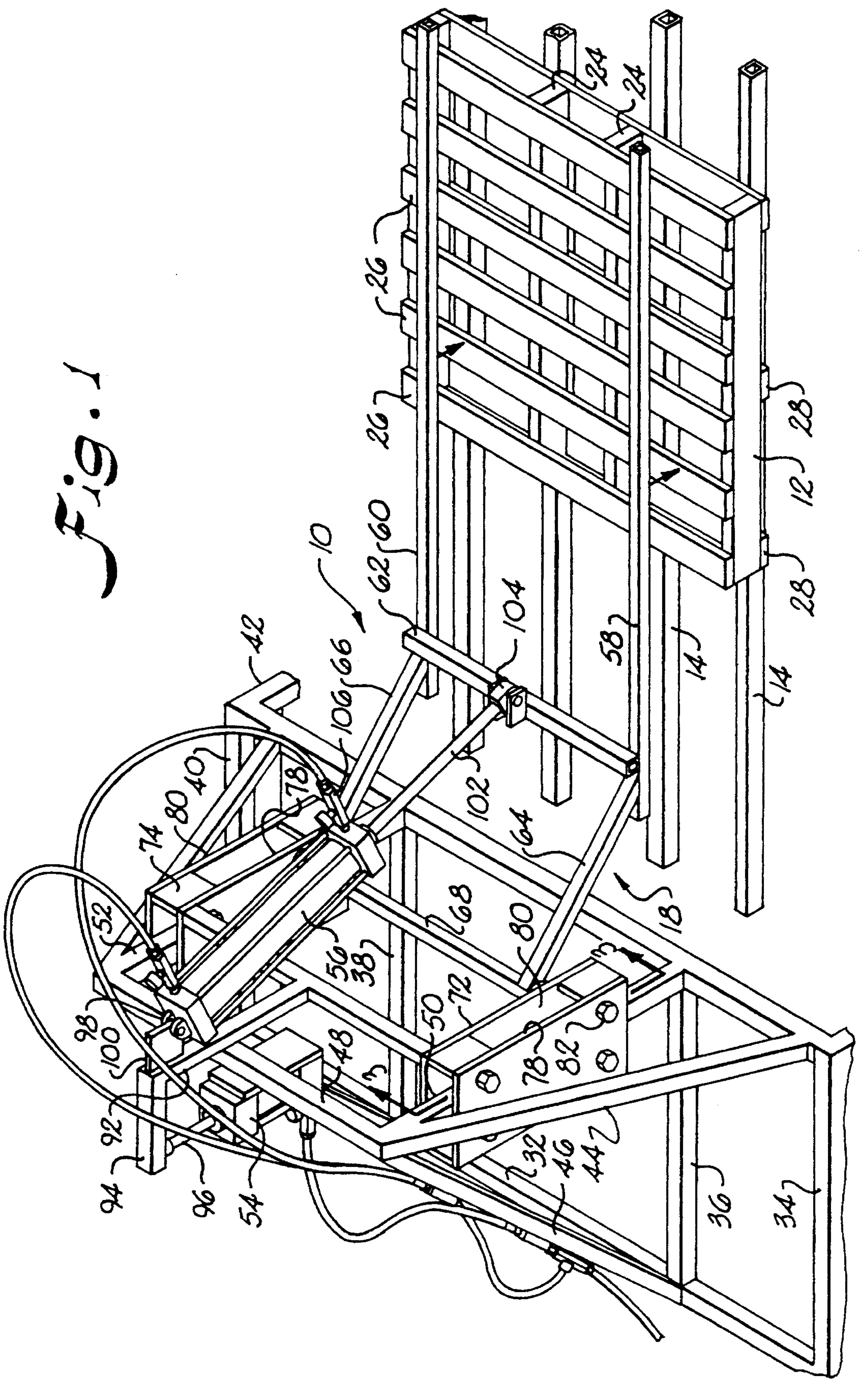
FIG. 1 is a perspective view illustrating a portion of the frame and in particular hold down arms being used for holding the deck boards of a pallet during a nailing operation.

Reference will now be made in detail to the present preferred embodiment of the invention. The example of the preferred embodiment illustrated in the figures is provided by way of an explanation of the invention, not limitation of the invention. The numbering of components in the drawings is consistent throughout the application, the same components having the same number in each of the drawings.

Figure 3:
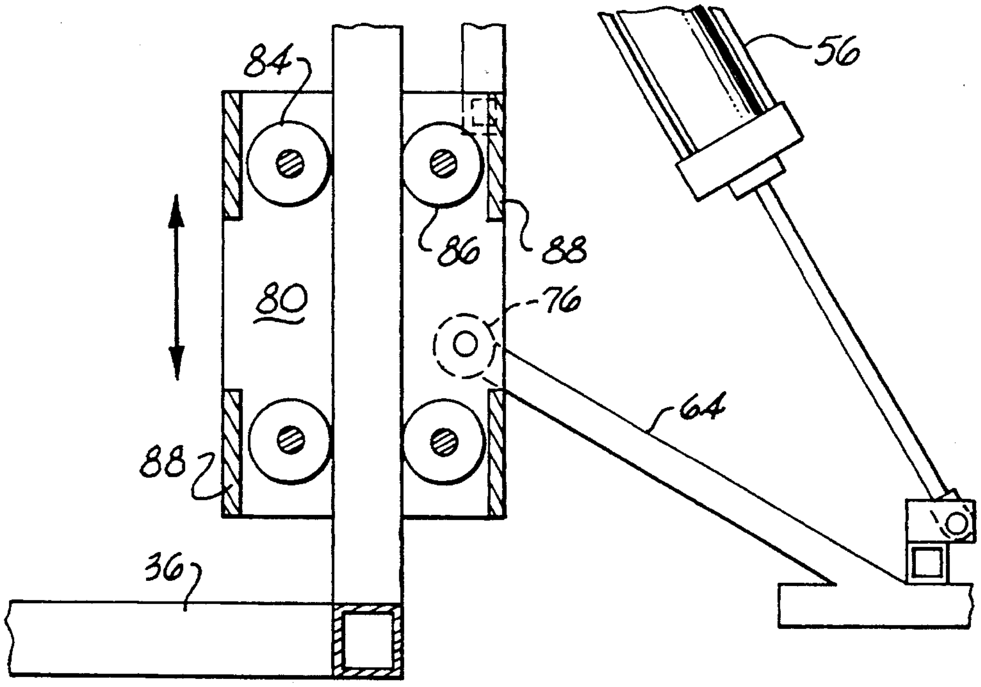
FIG. 3 is a sectional view taken along line 3—3 of FIG. 1.

Referring in more particular to FIGS. 1 and 3 of the drawings, there is disclosed a pallet making machine generally designated by the reference character 10 wherein a pallet 12 is carried on a table 14 that has a driven chain 16 supported thereon. Positioned adjacent to one end of the table 14 is a pivotal arm arrangement generally designated by the reference character 18 which is used for holding the boards of the pallet in position during a nailing operation.

Nails are used for securing the deck boards 26 to the stringers 24 of the pallet and are applied by an automatic nailing device 20 that is carried on a movable gantry 22. The entire frame of the movable gantry is not disclosed in detail but includes a frame that is supported on a rail carried on the floor of the building in which the pallet making machine is located. Any suitable wheel arrangement for supporting the gantry 22 could be used as long as it permits reciprocal movement of the gantry.

The pallet 12 that is to be constructed consists of a plurality of horizontally spaced stringers 24 upon which a plurality of longitudinally spaced deck boards 26 and base boards 28 are nailed to form a composite pallet such as shown in FIG. 1. The pallet manufacturing machine generally consists of a plurality of automatically operated nailing machines 20 that are carried on a gantry 22. The gantry is moved over the unnailed pallet that has been previously laid out by hand on the table 14. Prior to the nailing machine's movement over the unnailed lay up of the pallet 12, a pivotal arm arrangement 18 is lowered down on top of the deck boards 26 to hold the pallet in position during the nailing operation. After the pivotal arms hold down device 18 is in position, then the gantry 22 is moved longitudinally along the table, and the nailing operation which is controlled by a programmable controller nails the deck boards and base boards to the stringers 24.

The hold down mechanism 18 includes a support frame formed from a plurality of laterally extending tubular members 30 and 32 that are joined by longitudinally extending tubular members 34, 36, 38, and 40. This structure is in turn supported on vertical extending tubular members 42 that are fixed to the floor or the like. Angle tubular members 44 and 46 extend upwardly from the support members 30 and 32 and are joined to an upper horizontally extending tubular member 48. Similar angle members are carried on the other side of the frame for supporting the horizontal support tubular member 48. Vertically extending tubular slide bars 50 and 52 extend from the horizontal tubular member 48 and the laterally extending base tubular member 30.

A pair of hydraulically operated cylinders 54 and 56 are provided for raising and pivoting longitudinally extending clamping arms 58 and 60. The clamping arms 58 and 60 are constructed of tubular members and are fixed to a cross-tubular member 62. The clamping arms 58 and 60 are also fixed to tubular members 64 and 66 which have their other end attached to a horizontally extending tubular member 68 that in turn has its ends pivotally attached to side blocks 72 and 74. The pivot connection to side block 72 is shown by the phantom lines 76 in FIG. 3. The slide blocks 72 and 74 consist of a pair of spaced plates 78 and 80 that are secured together by means of bolts 82 on opposite sides of the vertically extending slide bars 50 and 52. Rollers 84 and 86 are carried between the plates 78 and 80 for guiding the movement of the slide plates as they are raised and lowered on the slide bar 52. Spacer blocks 88 are interposed between the plates 78 and 80 for holding them apart a predetermined distance.

In order to permit the slide plates 72 and 74 to move up and down in unison, they are connected together through a horizontal extending tubular member 90 that has a vertically extending tubular member 92 connected thereto. A rearwardly extending tubular member 94 is connected to the vertically extending tubular member 92. The hydraulic cylinder 54 is fixed to the cross-member 48, and its piston 96 is connected to the rearwardly extending tubular member 94.

As a result when the piston is extended it raises the laterally extending tubular member 94.

The pneumatic cylinder 56 is connected by a pivot joint 98 to a fixed plate 100 attached to the laterally extending tubular member 94.

A piston 102 extending out of the cylinder 56 is pivotally connected by pivot joint 104 to crossbar 62 that is in turn fixed to the clamp arms 58 and 60. The operation of the clamping arms will now be briefly described. When air is supplied to the bottom port of the pneumatic cylinder 54, it causes piston 96 to be raised. This in turn pushes up against laterally extending tubular member 94 to raise the clamp arms. As the piston is raised, the slide plates 72 and 74 slide upwardly along the slide bars 50 and 52. Since the clamp arms 58 and 60 are connected through the angle members 64 and 66 to the horizontal member 68 extending between the side plates, such raises the clamp arms vertically. When it is desired to pivot the clamp arms from a horizontal position such as shown in FIG. 1 to an angled position such as shown for example in FIG. 4, air pressure is supplied to lower port 106 or pneumatic cylinder 56. This causes the piston 102 to be retracted and the arms are pivoted about the pivot joint 76 carried by the slide blocks 72 and 74. When it is desired to lower the clamp arms to a horizontal position then air is supplied to the upper port 108 of the pneumatic cylinder 56 and exhausted from the lower port.

The nailing operation is performed by a plurality of nailing guns which are of conventional construction that are carried on a gantry 22 that is moved longitudinally along the table for sequentially nailing the upper and lower deck boards 26 and 28 to the stringers 24. The gantry is supported on a frame which permits it to slide along a rail carried on the floor of the building. Any suitable conventional frame or dolly structure can be used as long as it can be moved by a chain or the like.

Figure 2:
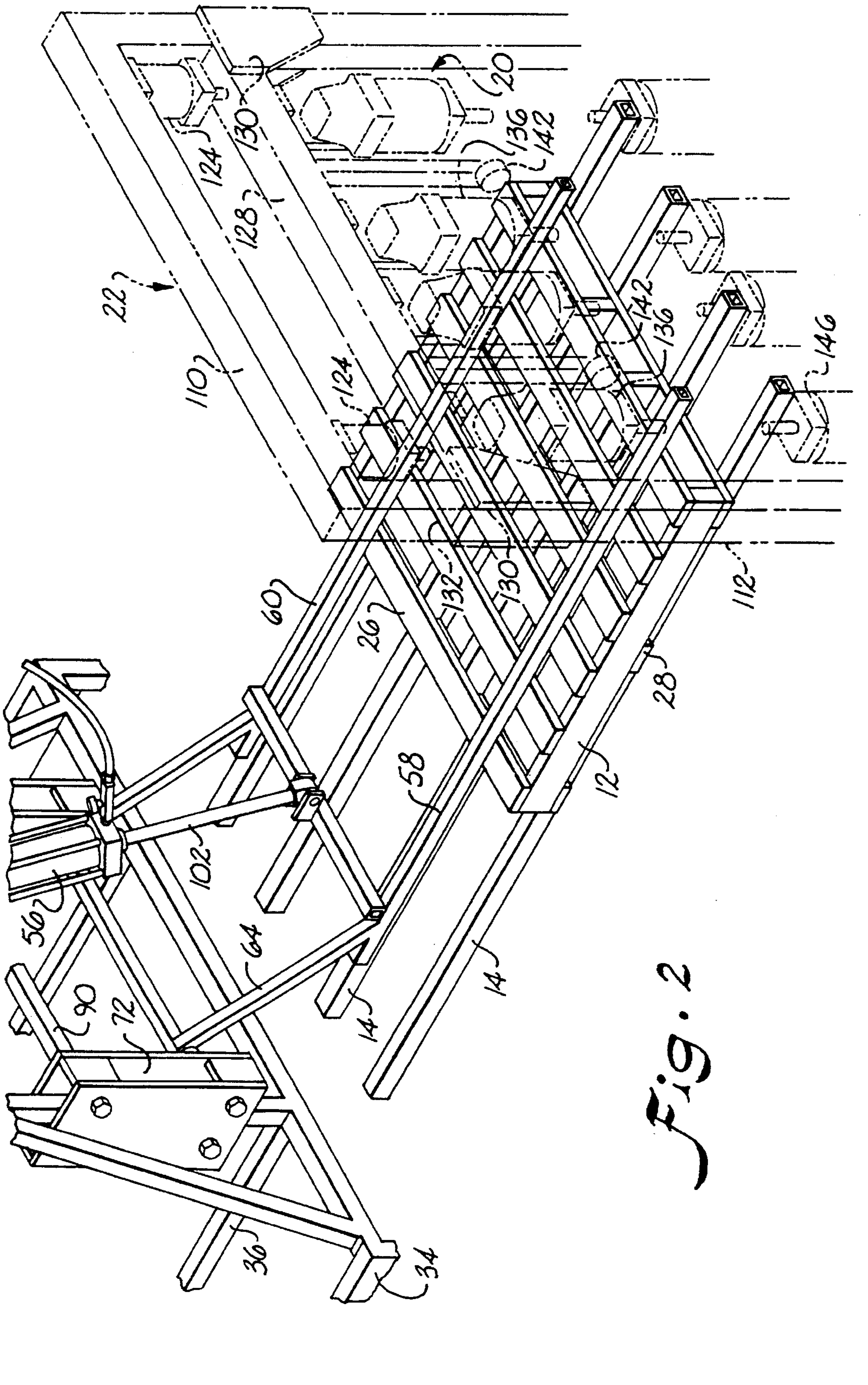
FIG. 2 is a fragmentary perspective view illustrating the relationship of a pallet, hold down arms, and a gantry supporting automatic nailing devices.
Figure 4:
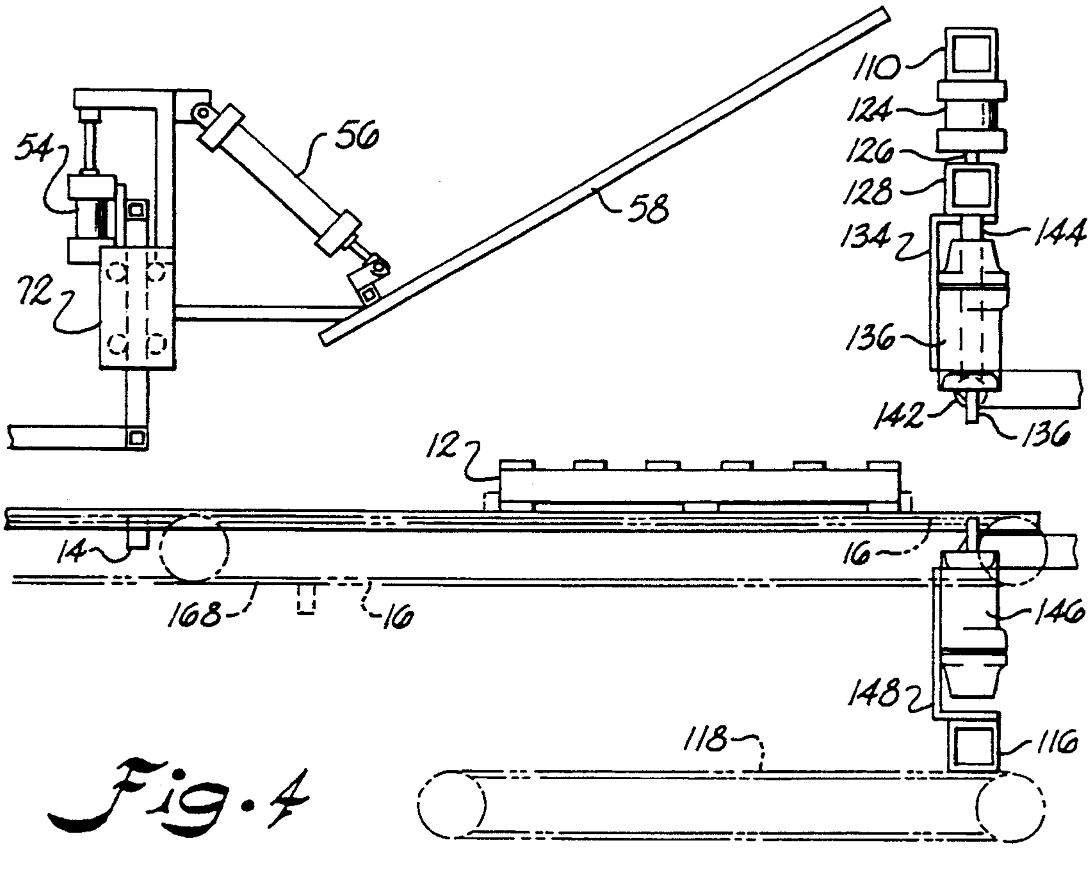
FIG. 4 is a side elevational view illustrating partially in schematic form a pallet constructing machine prior to the nailing operation.
Figure 8:
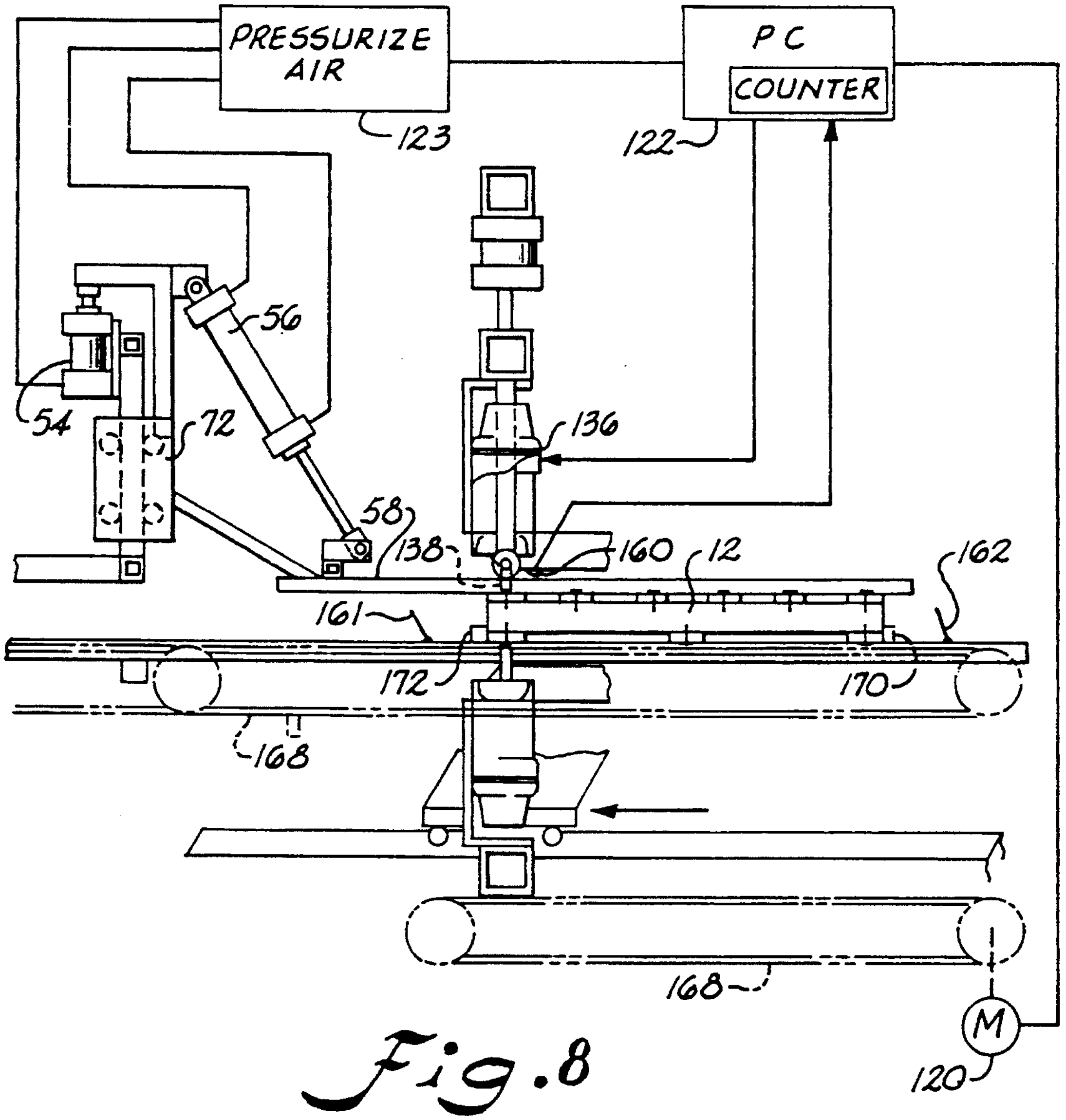
FIG. 8 illustrates in schematic form the controls for the machine.
Figure 9:
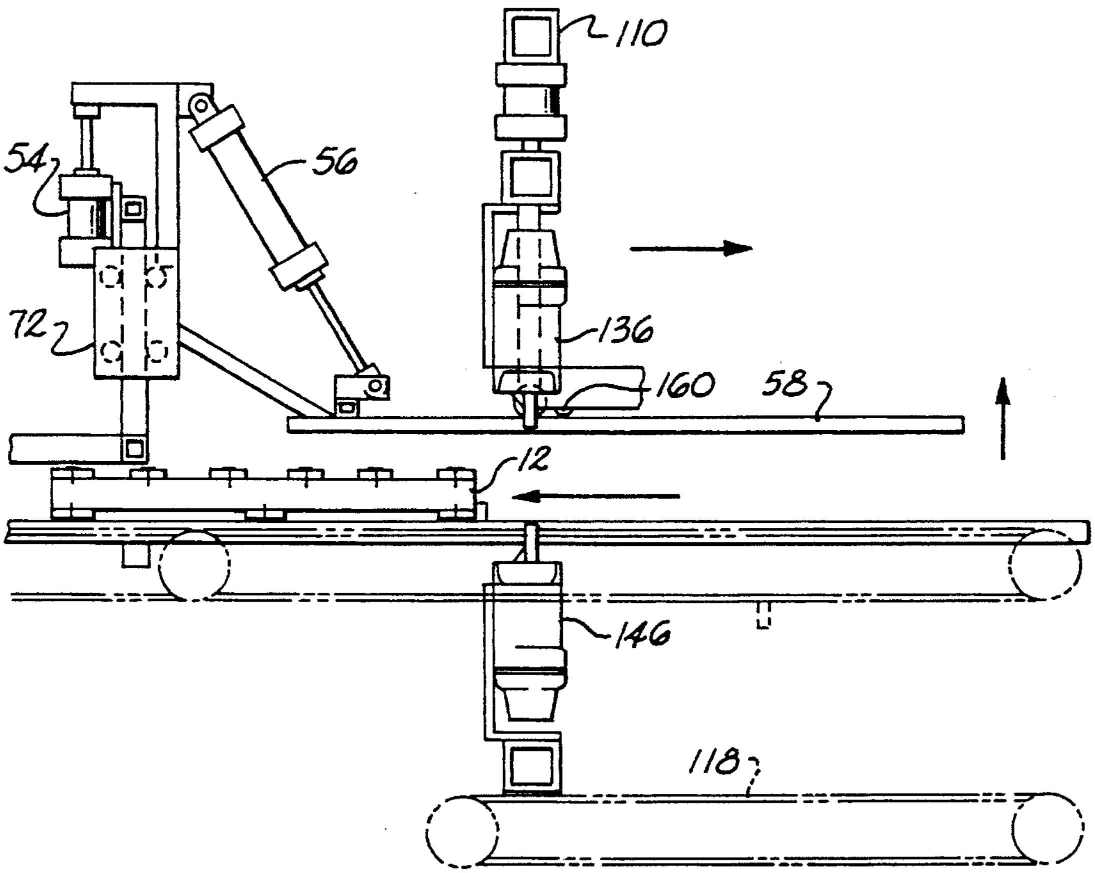
FIG. 9 is a side elevational view partially in schematic form illustrating the pallet constructing machine after the nailing operation.

As shown in FIGS. 2 and 4, the gantry includes a laterally extending horizontal tubular member 110 that is fixed to vertically extending tubular members 112 and 114. The lower end of the tubular members 112 and 114 are attached to a lower horizontally extending tubular member 116. The horizontally extending tubular member 116 is in turn supported on a rail (not shown) that permits the entire gantry to ride along the floor. The lower tubular member 116 is also attached to a driven chain 118 such as shown in FIGS. 4 and 8. The chain 118 is in turn driven by a reversible motor 120 which is under control of a programmable controller 122 so that it can be driven in a foward direction and then reversed to return the gantry back to its initial position.

A pancake cylinder 124 is fixed to the lower side of the upper tubular member 110 and has a piston 126 extending out the lower end thereof that is in turn fixed to a vertically movable tubular member 128. The tubular member 128 is carried between the vertical extending tubular members 112 and 114 and is held therebetween by side plates 130 and 132. A bracket 134 is connected to the bottom of the movable tubular member 128 and supports a conventional nailing gun 136. The barrel 138 of the nailing gun is carried adjacent to the bottom thereof and is supplied with nails through an automatic feed 140. The nailing gun is a conventional nailing gun which is equipped with a conventional automatic feed. Positioned directly adjacent to the barrel of the nailing gun is a roller 142 that is in turn rotatably supported on the lower end of the post 144. The purpose of the roller 142 is to limit the downward movement of the nailing gun and to also rest on top of the pivotal arms 58 and 60 for stabilizing the gantry and the nailing guns as the gantry is moved longitudinally during its nailing operation. The rollers 142 rest on the upper surface of the tubular members 58 and 60 and apply pressure to the clamping arms. As can be best seen in FIG. 2, there are four spaced nailing guns carried above the table 16 for nailing the deck boards 26 to the stringers 24, and there are also four nailing guns 146 carried below the table 16 for nailing the lower deck boards 28 to the stringers 24.

The nailing guns 146 carried below the table 16 are in turn supported by brackets 148 which are fixed to the tubular member 116 that is in turn fixed to the movable chain 118 which is used for moving the gantry back and forth during the pallet manufacturing operation.

Referring now to FIG. 8 of the drawings, the controls for the pallet building machine are shown schematically. Positioned closely adjacent to the barrel 138 of the nailing gun is a photoelectric sensor 160 which is provided for generating a signal upon sensing the presence of one of the deck boards and feeding a signal to the programmable counter 122. The position of the gantry in the nailing operation shown in FIG. 8 is nailing the last board, and it is to be understood that the nailing operation commenced after the operator laid out the boards forming the pallet and pushed a start button. Upon activating the start button on the pc, the motor 120 begins driving the chain upon which the gantry is secured. The gantry in turn is supported on a rail and rollers and moves to the left as shown in FIG. 8. When the nailing head 136 is positioned closely adjacent to the first deck board, a sensor 160 generates a signal and sends this signal to the programmed controller. The programmable controller which includes a counter starts a count. Depending on the setting for the operation of the nailing gun when the count reaches a desired number say 5, it activates the nailing guns to drive a nail into the boards. When the sensor 160 moves off of a board, the count stops until the gantry is moved forward to a position where the sensor 160 in senses the presence of the board. Upon sensing the presence of the board again, it starts the counter in the programmable controller to initiate the nailing operation after a predetermined number of counts.

The programmable controller also controls the operation of lifting pivoting the pivotal arms 58 and 60 by supplying air to and permitting air to exhaust from the cylinders 54 and 56.

The operation of the pallet constructing machine will now be discussed in connection with FIGS. 4 through 9 which illustrate the sequence of operation.

The first step in the operation is that the operator of the machine manually lays out the lower deck boards 28 on the table formed by the rails 14. He then places the stringers 24 in position and places a layer of spaced upper deck boards 26 on top of the stringers to produce an unnailed such as shown in FIG. 1.

Figure 5:
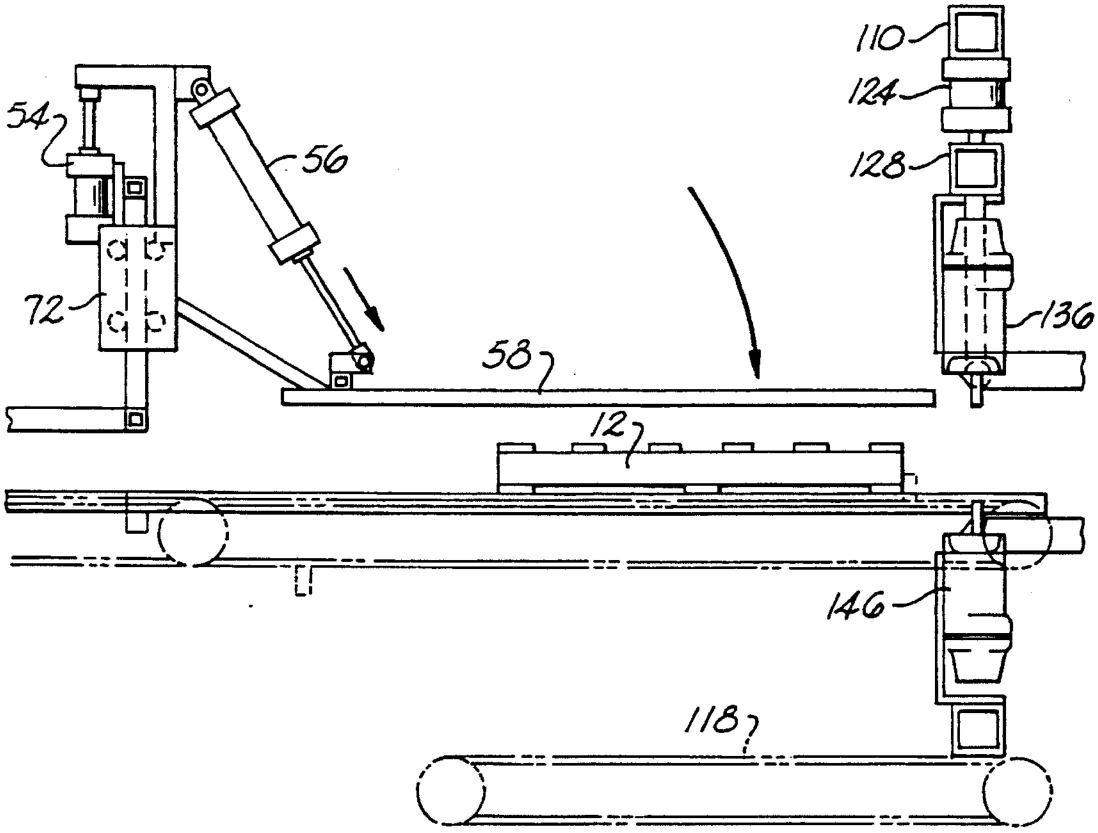
FIGS. 5 through 7 are side elevational views partially in schematic form illustrating the various steps of operation during the nailing and constructing operation of a pallet.

The operator then depresses a start button associated with the programmable controller 122 which supplies air to the upper port 108 of the cylinder 56. This causes the arms 58 and 60 to be pivoted downwardly to the horizontal position such as shown in FIG. 5. Air is then exhausted from the cylinder 54 allowing the piston 96 to be retracted causing the entire frame that supports the arms 58 and 60 to be lowered to the position shown in FIG. 6. As the pivotal arms and slide box are lowered they slide downwardly on the side bars 50 and 52. The purpose of first pivoting the pivotal arms 58 and 60 to the horizontal position such as shown in FIG. 5 is to ensure that the pivotal arms are parallel to the upper surface of the pallet to compensate for pallets of different heights. The pneumatic cylinder 54 in this particular apparatus is not operated as a double acting cylinder and the weight of the frame and the arms is sufficient clamping force to hold the deck boards 26 in position.

Figure 6:
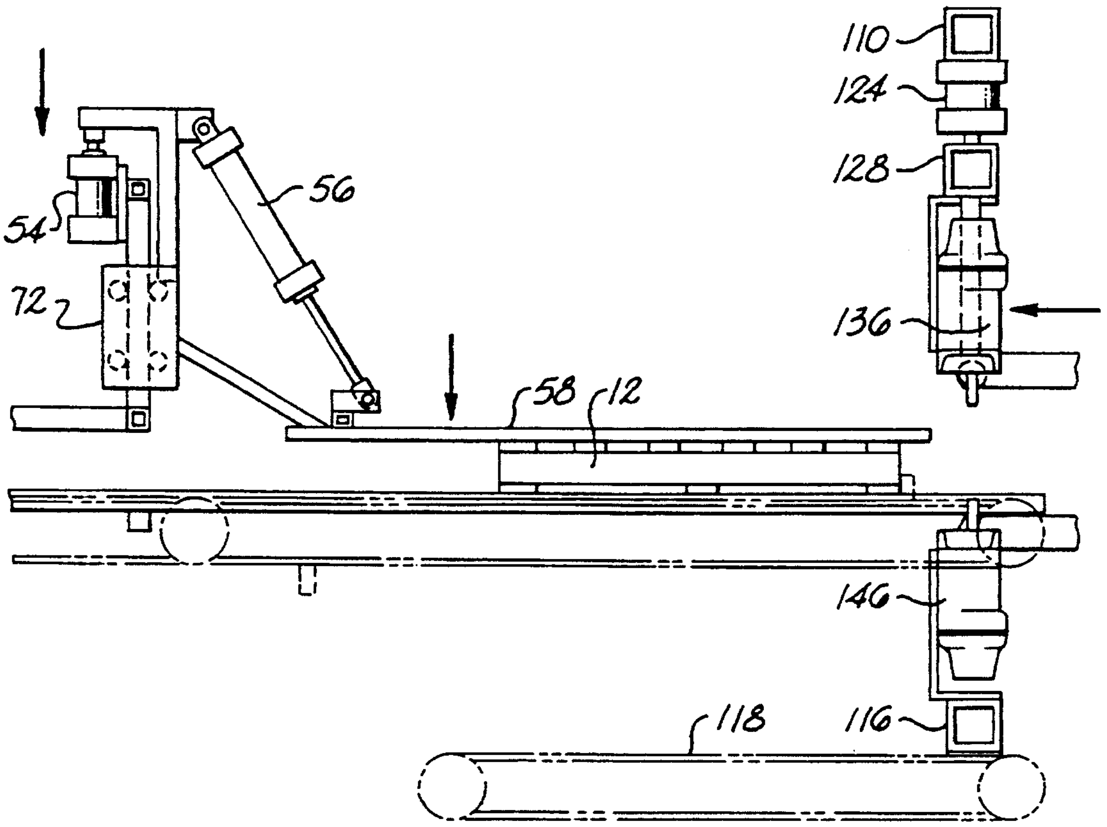
Figure 7:
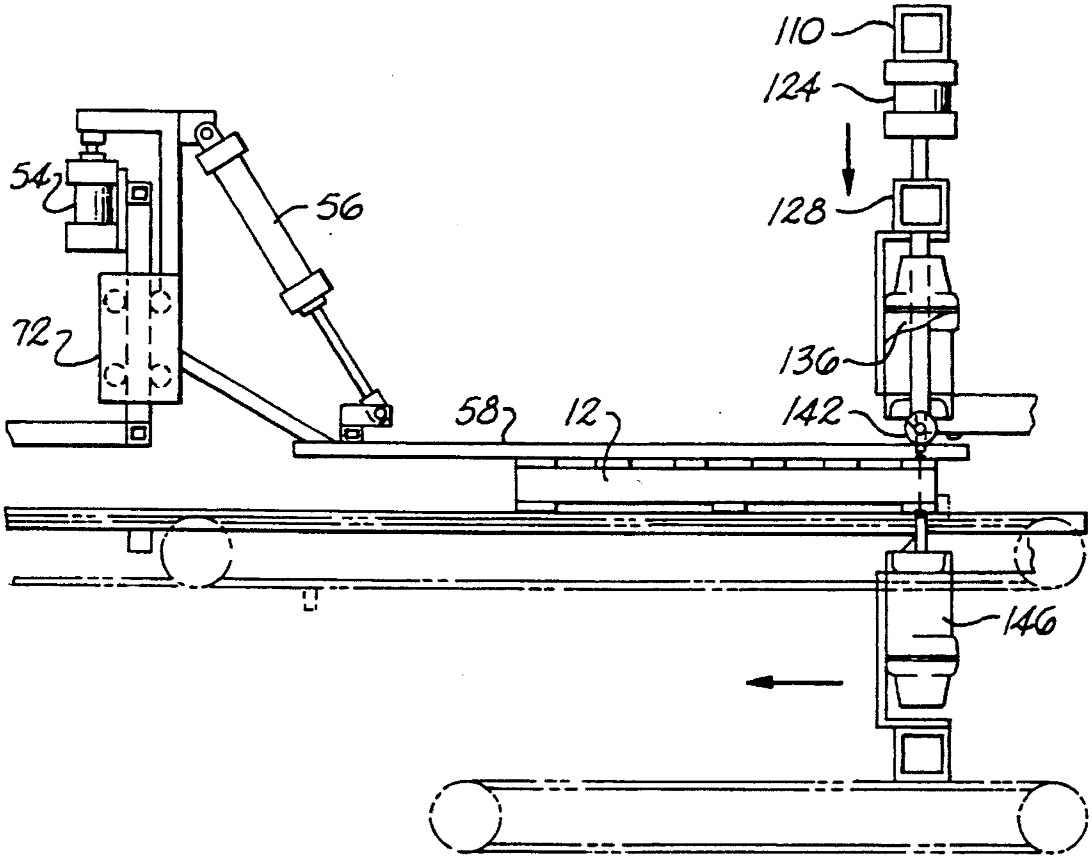

Once the clamping arms 58 and 60 are pressed down on the pallet such as shown in FIG. 6, then the motor 122 is activated by the programmable controller to move the gantry to the left so that the nailing guns 136 extend over the pallet. Pressurized air is then removed from the pancake cylinder 124 allowing the nailing guns to drop downwardly to the position shown in FIG. 7 until the wheels 142 rest on top of the arms 58 and 60. Such provides at least two functions: (1) it applies an additional clamping force to the bars 56 and 58; and (2) it also limits the downward movement of the nailing gun so as to properly locate the barrel of the nailing gun relative to the top of the deck boards 26 forming part of the pallet.

The gantry continues moving to the left. Upon the photoelectric sensor 160 sensing the presence of the first board a signal is generated which is fed back to the programmable counter. Such initiates a count cycle. After a predetermined number of counts, a signal is sent back to the nailing gun from the programmable counter 122 to activate the nailing guns to drive a nail through the deck board. The count continues until the sensor moves off of the trailing edge of that particular board. It is to be understood of course that the nailing operation can be controlled so that any suitable number of nails can be driven into a board. As the gantry 22 moves further to the left where the photoelectric sensor senses the leading edge of the next board it again sends a signal to the programmable counter which begins a count cycle to perform the nailing operation for the next board. This step is repeated for every board spaced along the top of the pallet.

When the gantry moves beyond the leading edge of the pallet 12, it strikes a limit switch 161 which stops the forward movement of the gantry and causes the motor to be reversed to move the gantry back to its beginning position such as shown in FIG. 4. When the gantry 22 reaches its beginning position such as shown. in FIG. 4, it engages a limit switch 162 to stop the rearward movement of the gantry. The programmable controller then causes a signal to activate pneumatic switches associated with a source of pressure 123 to supply air to the cylinder 54 for raising the arm vertically. Air is also supplied by the source of pressure to the lower port 106 of the pneumatic cylinder 56 for pivoting the arms up to a position such as shown in FIG. 4. Once the pivotal arms have been raised then a conveyor chain shown in schematic form and identified by the reference character 168 is activated to move the nailed pallet to the left to a receiving station. The motor for driving the chain 168 is not disclosed but it can be any suitable conventional motor that upon being energized will rotate the chain 168. The chain has a pair of dogs 170 and 172 provided thereon for aiding in positioning the deck boards when the operator is laying out the loose boards. The dogs 170 and 172 also aid in transporting the nailed up pallet from the pallet making machines.

It will be apparent to those skilled in the art that various modifications and variations can be made in the present invention without departing from the scope or spirit of the invention. It is to be also understood that other types of drive mechanisms for the conveyor chains and motor controls for the driving of the conveyor chains as well as control circuits for activating the nailing guns and pneumatic switches associated with the pressure source for activating the pneumatic cylinders can be substituted for the particular items shown in the drawings. The drawings only illustrate one particular embodiment, and it is to be understood that other variations and modifications can be made to the structure disclosed therein without departing from the spirit or scope of the present invention.

What is claimed is:

1. An apparatus for holding boards as they are being nailed when constructing a wooden pallet formed by an upper tier of spaced boards, an intermediate tier of boards and a bottom tier of spaced boards, comprising:

a receiver for supporting said boards prior to being nailed together, wherein said respective upper and bottom tier of boards include elongated spaced apart boards with the longitudinal axis of said boards through the elongated length thereof being parallel in each respective said tier;

a movable nail driving mechanism for successively driving nails into adjacent boards of said upper and lower tiers of boards for forming said pallet;

a pivotal arm pivotable in a plane substantially perpendicular to said longitudinal axis of said upper tier of boards for simultaneously pressing down on all of said upper tier of boards while said nail driving mechanism drives said nails into successive boards of said upper tier of boards; and a lifting mechanism for lifting said pivotal arm out of engagement with said upper tier of boards for removing said nailed pallet.

2. The apparatus as set forth in claim 1, wherein said pivotal arm includes a pair of laterally spaced elongated arms for engaging said upper tier of boards during the nailing operation.

3. The apparatus as set forth in claim 2, further comprising a pivot member connected to one end of said arms, and wherein said lifting mechanism includes a power operated cylinder connected to said pair of arms for raising and lowering said arms about said pivot member.

4. The apparatus as set forth in claim 3, further comprising:

a movable support structure supporting said pivot member and said elongated arms; and a power operated lift device for raising and lowering said movable support structure and elongated arms.

5. The apparatus as set forth in claim 2 wherein said movable nail driving mechanism includes:

a gantry;

a plurality of nail drivers carried by said gantry;

a power operated lift device for raising and lowering said nail drivers; and a stop for limiting the downward movement of said nail drivers for positioning said nail drivers a predetermined distance from said upper tier of boards during the nailing operation.

6. An apparatus for holding boards as they are being nailed when constructing a wooden pallet formed by an upper tier of spaced boards, an intermediate tier of boards and a bottom tier of spaced boards, comprising:

a receiver for supporting said boards prior to being nailed together;

a movable nail driving mechanism for successively driving nails into adjacent boards of said upper and lower tiers of boards for forming said pallet;

a pivotal arm for pressing down on said upper tier of boards while said nail driving mechanism drives said nails into successive boards of said upper tier of boards;

said pivotal arm includes a pair of laterally spaced elongated arms for engaging said upper tier of boards during the nailing operation;

a lifting mechanism for lifting said pivotal arm out of engagement with said upper tier of boards for removing said nailed pallet, said movable nail driving mechanism includes:

a gantry;

a plurality of nail drivers carried by said gantry;

a power operated lift device for raising and lowering said nail drivers; and a stop for limiting the downward movement of said nail drivers for positioning said nail drivers a predetermined distance from said upper tier of boards during the nailing operation, said stop including a roller which engages one of said elongated arms to limit the downward movement of said nail drivers.

7. The apparatus as set forth in claim 6, further comprising a drive mechanism for shifting said gantry with said nail drivers along the length of said apparatus for positioning said nail drivers relative to said boards for driving nails into said boards, said roller riding on said elongated arm as said drive mechanism shifts said gantry along the length of said apparatus.

8. The apparatus as set forth in claim 7, further comprising:

a sensor carried by said gantry for sensing the presence of a board and generating a signal responsive thereto; and a controller for activation of said nail drivers responsive to said sensor sensing the presence of a deck board.

9. The apparatus as set forth in claim 8 wherein said sensor is a photoelectric sensor that generates a signal responsive to sensing the presence of a board.

10. An apparatus for constructing pallets by nailing upper and lower deck boards to stringers comprising:

a receiver for supporting said deck boards and said stringers prior to being nailed together;

an elongated hold down device;

a raising and lowering mechanism connected to said elongated hold down device for selectively lowering said elongated hold down device in contact with said upper deck boards;

nail drivers for driving nails for nailing said upper deck boards to said stringers while said upper deck boards are held in position by said hold down device;

said hold down device including:

a pair of arms;

a pivot connecting one end of said arms, said raising and lowering mechanism including a first power operated cylinder for raising and lowering said pair of arms vertically; and a second power operated cylinder for pivoting said arms about said pivot.

11. The apparatus as set forth in claim 10, further comprising:

a gantry for supporting said nail drivers;

a driving mechanism for shifting said gantry relative to said upper and lower deck boards and said stringers;

a sensor carried by said gantry generating a signal responsive to being positioned adjacent an upper deck board; and a controller connected to said sensor and said nail drivers for activating said nail drivers responsive to receiving a signal from said sensor.

12. The apparatus as set forth in claim 11 wherein said controller includes a counter for causing said controller to activate said nail drivers after a predetermined lapse of time from receiving said signal from said sensor.

* * * * *